Patented Apr. 20, 1937

2,078,200

UNITED STATES PATENT OFFICE 2,078,200

SET-STABILIZED GYPSUM PLASTER

George D. King, Chicago, Ill., assignor to United States Gypsum Company, Chicago, Ill., a corporation of Illinois No Drawing. Application October 21, 1936, Serial No. 106,803

7 Claims. (Cl. 106—34)

The present invention relates to an improvement in set-stabilized gypsum plaster.

One of the objects of the present invention is to provide a calcined gypsum plaster that is stabilized as to its setting time against disturbance by adventitious admixture of accelerating and retarding influences, and which involves the use of substances that yield calcium sulfate dihydrate crystals which serve as seeding-agents for the initiation of the setting of the plaster. With this there is combined a suitable retarder in amounts sufficient to counterbalance the accelerating effect of the developed seed crystals.

A further object of the invention is to employ for the above-mentioned purpose a substance that will yield calcium hydroxide on hydrolysis, but which will not deteriorate on storage by the absorption of carbon dioxide from the air, so that its potential calcium sulfate-seed-crystal forming tendencies will remain unimpaired for an unlimited time.

In some aspects the present invention is a further improvement in the subject-matter of my previous Patent No. 1,989,641, of January 29, 1935, in which seed crystals of calcium sulfate dihydrate are developed in a gypsum plaster by the reaction between lime, as such, and an acid-reacting sulfate, such as aluminum sulfate or its equivalent.

Plaster of Paris, as commercially prepared, is chiefly a hemidydrate of calcium sulfate. Upon the addition of water, a chemical reaction occurs, which hydrates the hemihydrate to the dihydrate form of calcium sulfate. When plaster of Paris is mixed with water to a plaster consistency and allowed to hydrate, it sets and hardens to a rock-like product, which is of great value to industry and the construction of buildings. One of its better known applications is in the form of a wall coating or, as commonly termed, a wall plaster.

However, the normal time of set of neat plaster of Paris is generally less than thirty minutes, which is too rapid for convenient use in building construction. To increase the time of set, and prepare a product suitable for use as a wall covering, a small quantity of commercial preparation known as a retarder is added to the hemihydrate of calcium sulfate. Commercial retarder is a dispersion of prepared protein glue on lime. When used as a plaster for walls or other surfaces, plaster of Paris is generally mixed with sand, wood fiber or hair, and the requisite amount of commercial retarder to give an approximate time of set between 2 to 7 hours. At times, other materials are added to increase its plasticity, "slip," working qualities, sand carrying capacity, etc.

It is generally well known that impurities associated with the sand or the gaging water, job conditions of mixing, "set" plaster on tools or mixing vessels, etc., and weather, greatly affect the time of set and hardening rate of plaster of Paris. Atmospheric conditions are not stable and will vary from day to day. Such weather variations vary the time and conditions of plaster set. Under such conditions of use it is difficult, and at times impossible, to produce a satisfactorily plastered surface. In summer, for example, it is frequently found that the plaster will dry out before hydrating and setting. It therefore requires considerable care, not only by the plaster maker but also by the building craftsmen, to prepare a balanced plastering mix.

Again, plaster in storage has a marked tendency to age and lengthen or quicken in time of set.

Wall plaster, as shipped, usually contains no sand, since the sand can be conveniently and more economically added on the job in the amount depending largely upon the requirements of the job and the experience of the building craftsmen. The general practice is to use one part of plaster and one to two parts of sand for the scratch coat, and one part of plaster and two to four parts of sand for the brown coat. There are many who use a third coat of plaster, generally in the ratio of one part plaster and two parts sand as a base for the sand-floated finish coat. It is evident that the same craftsmen may use the plaster with, for example, one, two, three, or four parts of sand, which will aggravate and upset conditions governing the time of set and other physical characteristics of the plaster due to "seeding of crystallization" and acceleration of set action caused by the sand. In spite of all precautions, it is seen that there are influences beyond the control not only of the maker, but also of the building craftsmen, affecting the properties of the plaster.

Various attempts have been made in the past to produce a plaster with a time of set stabilized against the adventitious introduction of accelerating or retarding influences associated with sand, water, job conditions, etc. Some have used ground raw or set gypsum added to the calcined plaster. This method, however, did not prove to be entirely feasible, since the plaster is generally, in practice, bagged hot, which converts the added finely ground raw or set gypsum to the hemihydrate stage. The hemihydrate of calcium sulfate is not a stabilizing influence.

According to earlier proposals, lime and aluminum sulfate have been added to plaster to react chemically in the presence of the gaging water, thereby to precipitate the seeding agent, calcium sulfate dihydrate. But the lime causes some difficulties, including a loss of stability due to carbonation of the lime by absorption of carbon dioxide from the air; an excessive early stiffening of the plaster mix, a lime "skin" on the dried plaster, and a loss of sticky plaster qualities considered desirable in some localities.

It therefore is a further object of my invention to eliminate the effect of these variables affecting the time of set and rate of hardening of gypsum plaster and to overcome the defects of the aluminum sulfate—lime stabilizer, while still another object of my invention is to obtain a stabilized plaster possessing more practical and suitable working qualities.

An additional object of my invention is to provide a plaster which will permit the artisan ample time for proper manipulation and still assure him of good results in obtaining a uniformly and quickly hardened plaster without "lime skin."

The preferred materials of my new and improved plaster are plaster of Paris, Portland cement, aluminum sulfate, $Al_2(SO_4)_3.18H_2O$, generally known as paper-makers' alum, and retarder. I do not wish to confine myself to these ingredients specifically, as there are other equivalents which will perform in substantially the same manner. Nor is it my desire to limit myself to any quantities stated herein, which are given only as examples, for the same may be varied within certain limits without departing from the spirit of this invention.

Generally, gypsum plaster is received on the job unsanded, but containing a small amount of fiber, either hair, wood, or sisal, and the necessary amount of retarder. This particular form is known as cement plaster. As described previously, various amounts of sand are added as desired for the application of different gypsum plaster coats. The amount of sand used is usually dictated either by the economics of the job or by the essential hardness requirements of the resultant wall. Naturally, such practice will vary from locality to locality. The cement plaster is generally adjusted by the manufacturer for a setting time approximately between 2 and 7 hours when mixed with two parts of sand. However, if less or more sand is used than that for which the plaster is adjusted, there is a corresponding change in time of set of the plaster, depending upon the quantity of sand and, in some measure, upon the quantity and nature of impurities found associated with the sand.

The merits of my invention are best illustrated by the following examples and comparisons, which are typical of the results generally obtained. The following mixes were prepared and their time of set actually determined under job conditions:

*Ordinary wall plaster*

| | Pounds |
|---|---|
| Calcined gypsum (hemihydrate) | 2000 |
| Commercial retarder | 8 |

| Plaster to sand | Time of set | |
|---|---|---|
| | Job | Laboratory clean conditions |
| Ratio | Hours | Hours |
| 1:0 | 12:45 | 30 |
| 1:1 | 6:15 | 12 |
| 1:2½ | 4:10 | 7 |
| 1:4 | 2:50 | 3:30 |

*Improved set-stabilized plaster*

| | Pounds |
|---|---|
| Calcined gypsum (hemihydrate) | 2000 |
| Portland cement | 25 |
| Aluminum sulfate $(Al_2(SO_4)_3.18H_2O)$ | 15 |
| Retarder | 10½ |

| Plaster to sand | Time of set | |
|---|---|---|
| | Job | Laboratory clean conditions |
| Ratio | Hours | Hours |
| 1:0 | 4:35 | 8:00 |
| 1:1 | 3:45 | 5:00 |
| 1:2½ | 3:20 | 3:40 |
| 1:4 | 3:05 | 3:20 |

It is to be noted that the variation in the setting time of ordinary plaster mixed with different amounts of sand is considerably greater in comparison than identical mixes of my improved plaster and sand. The results indicate to a certain degree what benefits can be obtained in actual use.

The amount of Portland cement, aluminum sulfate and retarder added to the calcined gypsum hemihydrate may be varied within certain limits. The retarder must be present in sufficient quantities to retard the setting time of the mixture of calcined gypsum hemihydrate, aluminum sulfate $(Al_2(SO_4)_3.18H_2O)$ and Portland cement to a point where reasonably large quantities of the plaster-water mixture can be prepared, either neat or with an aggregate like sand, and the prepared plastic mass will remain in such condition sufficiently long to allow it to be placed on the wall before it hardens or stiffens. The retarder will usually vary from about 6 pounds to 14 pounds per ton of plaster. The amounts of Portland cement and aluminum sulfate to be added depend upon the degree of stabilization desired and economy.

Normally, the time of set will be about 3 hours, but different times of set may be desired by different consuming markets. The quantities of ingredients in my improved plaster may be varied. The Portland cement may be used in quantity from about 5 pounds to 100 pounds per ton of plaster, and the aluminum sulfate from about 5 pounds to 50 pounds per ton of plaster. It is usually preferable to have the Portland cement in an amount greater than the aluminum sulfate, though this is not essential.

Though I prefer to use Portland cement because of its availability, certain other materials such as those which form $Ca(OH)_2$ on hydrolysis, can be substituted with effective results. For instance, finely ground rock or slag wool, natural cement, finely ground slag, etc. may be used. In fact, any salt of calcium, which hydrolyzes and reacts in an alkaline manner in an aqueous solution, may be used. Again, I find that I can substitute for the aluminum sulfate effectively any sulfate salts of metals, which hydrolyze with an acid reaction in an aqueous solution, such as ferric sulfate, potassium acid sulfate, copper sulfate, nickel sulfate, etc. Other retarders may be used, such as powdered glue, phosphates, acetates, citrates, timothy hay extract, etc., but the regular commercial retarder is preferred.

It is, moreover, also possible to employ, in addition to the salt capable of yielding calcium hydroxide on hydrolysis, a certain percentage of actual calcium hydroxide. Thus a part of the Portland cement may be replaced by, for example, calcium hydroxide. It is probable that the calcium hydroxide first reacts with a part of the alum, whereafter the remainder of the alum reacts with the hydrolyzing calcium salt (i. e., the Portland cement, if that is the one employed). The invention is therefore to be construed as including this modification as well. For most purposes, a mixture of calcined gypsum, Portland cement, and aluminum sulfate and retarder will be the preferred formula, but the invention is not to be limited thereto any further than is consistent with the claims hereunto appended.

I would state in conclusion that while the examples described constitute practically the embodiments of my invention, I do not wish to confine myself to these details since manifestly the same may be varied considerably without departing from the spirit of this invention as defined in the appended claims.

Having described my invention, I claim as new and desire to secure by Letters Patent:

1. Gypsum plaster whose setting-time is stabilized against disturbance by adventitious admixture of accelerating and retarding influences which comprises calcium sulfate as the setting ingredient and not exceeding about 165 pounds per ton of a set-stabilizing composition which latter comprises a retarder, a calcium salt capable of yielding calcium hydroxide on hydrolysis, and an acid-reacting water-soluble sulfate.

2. Gypsum plaster whose setting-time is stabilized against disturbance by adventitious admixture of accelerating and retarding influences which comprises calcium sulfate as the setting ingredient and not exceeding about 165 pounds per ton of a set-stablizing composition which latter comprises a retarder, a calcium salt capable of yielding calcium hydroxide on hydrolysis, and aluminum sulfate.

3. Gypsum plaster whose setting-time is stabilized against disturbance by adventitious admixture of accelerating and retarding influences which comprises calcium sulfate as the setting ingredient and not exceeding about 165 pounds per ton of a set-stabilizing composition which latter comprises a retarder, a calcium salt capable of yielding calcium hydroxide on hydrolysis, and acid potassium sulfate.

4. Gypsum plaster whose setting-time is stabilized against disturbance by adventitious admixture of accelerating and retarding influences which comprises calcium sulfate as the setting ingredient and not exceeding about 165 pounds per ton of a set-stabilizing composition which latter comprises a retarder, Portland cement, and an acid-reacting water-soluble sulfate.

5. Gypsum plaster whose setting-time is stabilized against disturbance by adventitious admixture of accelerating and retarding influences which comprises calcium sulfate as the setting ingredient and not exceeding about 165 pounds per ton of a set-stabilizing composition which latter comprises a retarder, Portland cement, and aluminum sulfate.

6. Gypsum plaster whose setting-time is stabilized against disturbance by adventitious admixture of accelerating and retarding influences which comprises about 2000 parts of calcium sulfate as the setting ingredient, from 5 to 100 parts of Portland cement, 5 to 50 parts of aluminum sulfate, and from 6 to 14 parts of retarder.

7. Gypsum plaster whose setting-time is stabilized against disturbance by adventitious admixture of accelerating and retarding influences which comprises calcium sulfate as the setting ingredient and not exceeding about 165 pounds per ton of a set-stabilizing composition which latter comprises a retarder, lime, Portland cement, and an acid-reacting water-soluble sulfate.

GEORGE D. KING.